United States Patent [19]

Johansson et al.

[11] Patent Number: 5,041,223
[45] Date of Patent: Aug. 20, 1991

[54] ARRANGEMENT FOR AN INLET PIPE IN A ROTATING DRUM SIEVE

[75] Inventors: Ingvar Johansson; Goran Fredriksson, both of Gothenburg, Sweden

[73] Assignee: Roto-Sieve AB, Goteborg, Sweden

[21] Appl. No.: 399,511

[22] PCT Filed: Mar. 1, 1988

[86] PCT No.: PCT/SE88/00091

§ 371 Date: Aug. 29, 1989

§ 102(e) Date: Aug. 29, 1989

[87] PCT Pub. No.: WO88/06479

PCT Pub. Date: Sep. 7, 1988

[30] Foreign Application Priority Data

Mar. 2, 1987 [SE] Sweden .................. 8700853

[51] Int. Cl.$^5$ ............................. B01D 33/11
[52] U.S. Cl. .................. 210/403; 209/284; 210/456
[58] Field of Search ............... 210/394, 402, 403, 456, 210/784, 405; 209/270, 284, 285, 286, 294, 452

[56] References Cited

U.S. PATENT DOCUMENTS

| | | | |
|---|---|---|---|
| 3,163,601 | 12/1964 | Ericcson et al. | 210/394 |
| 3,695,448 | 10/1972 | Johansson | 210/403 |
| 4,236,999 | 12/1980 | Burgess et al. | 209/294 |
| 4,507,202 | 3/1985 | Nord et al. | 210/403 |
| 4,597,865 | 7/1986 | Hunt et al. | 210/394 |

FOREIGN PATENT DOCUMENTS

| | | | |
|---|---|---|---|
| 1180716 | 11/1964 | Fed. Rep. of Germany | 210/456 |
| 691940 | 5/1953 | United Kingdom | 210/394 |

Primary Examiner—Robert A. Dawson
Assistant Examiner—Joseph Drodge
Attorney, Agent, or Firm—Dvorak and Traub

[57] ABSTRACT

The present invention relates to an arrangement for an inlet pipe in a rotating drum sieve for the supply of sludge or a liquid mixed with particles to the inside of the rotating drum sieve, which drum sieve exhibits flow openings along its casing, in order to permit the separation of fluid from the sludge, etc., supplied to the internal space of the drum via plurality of discharge openings extending along the longitudinal axis of the drum and capable of being accommodated in the internal space of the drum. The invention permits the effective supply of sludge, etc., to the drum sieve in both small and large flows without the risk of blocking the inlet pipe. At least two simultaneously effective discharge openings for the supply of sludge, etc., to the internal space of the drum are situated on levels separate from one another.

17 Claims, 5 Drawing Sheets

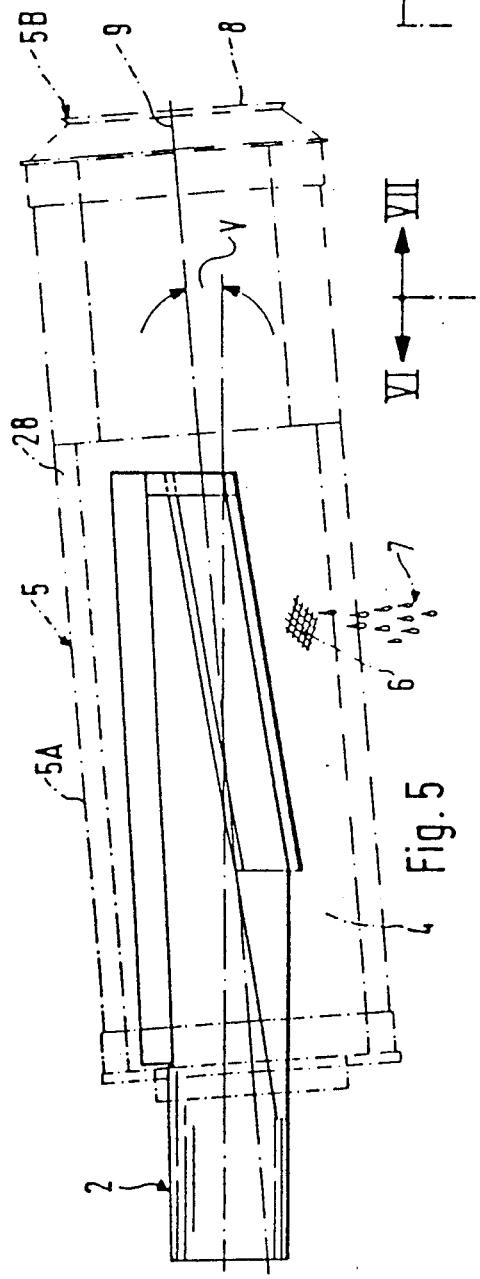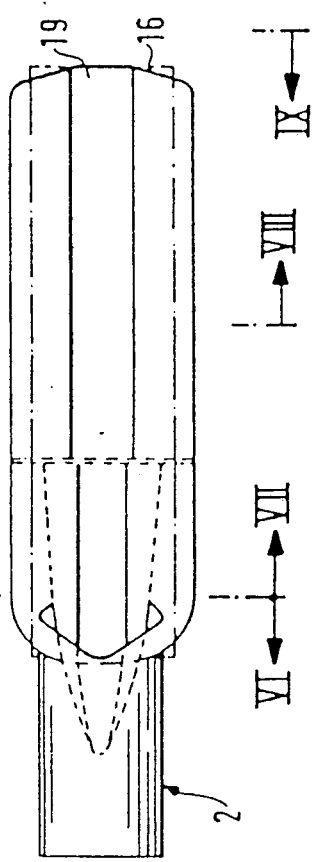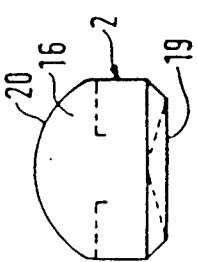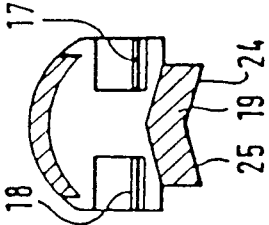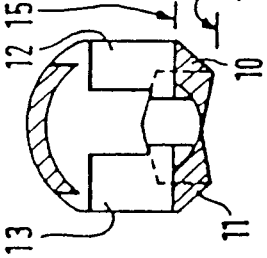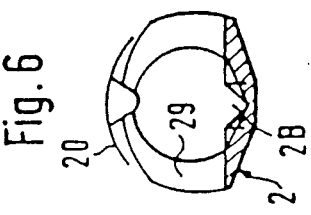

ARRANGEMENT FOR AN INLET PIPE IN A ROTATING DRUM SIEVE

The present invention relates to an arrangement for an inlet pipe in a rotating drum sieve for the supply of sludge or a liquid mixed with particles to the inside of the rotating drum sieve, which drum sieve exhibits flow openings along its casing, in order to permit the separation of liquid from the sludge, etc., supplied to the internal space of the drum via a number of discharge openings extending along the longitudinal axis of the drum and capable of being accommodated in the internal space of the drum, in conjunction with which the inlet pipe exhibits at least two discharge openings situated on levels separate from one another for the purpose of supplying sludge, etc., to the internal space of the drum.

Inlet pipes of the kind indicated above function excellently with regard to their high capacity for the sludge, etc., supplied. In the case of small flows, however, a plug of screenings can form inside the pipe, which plug is not washed away by small flows, unlike in the case of medium or maximum flows. This means that the liquid present in the sludge, etc., strikes the plug which has formed inside the inlet pipe and is discharged through any spillway which may be provided in the drum sieve plant.

Plug formation inside the pipe has caused liquid to flow at a concentrated rate out towards the sieve casing, with the result that the screenings have been less well drained, or, in other words, the sieve has not achieved its indicated capacity under conditions of peak load.

Screenings find their way into the sieve casing as the drum rotates, and drop down into the inlet pipe. These screenings then slide along the inlet pipe, and it is possible to demonstrate that they have dropped down into the spillway at a number of installations, due to the inclination of the pipe and the sieve.

In the case of sieves which are connected to an inlet box, the liquid remains in the pipe up to a level of half its diameter. This is of no consequence to the pipe, although it does create problems in connection with any work which requires to be carried out on the inlet box, since quite a considerable quantity of water is left in the bottom.

The principal object of the present invention is thus, in the first place, to make available an arrangement which solves said problems in such a way that one and the same inlet pipe is able to cope with all kinds of flow from 0 up to the maximum throughput of the sieve, with all the problems previously caused by the screenings removed by sieving.

Said object is achieved by means of an arrangement in accordance with the present invention, which is characterized essentially in that the inlet pipe is freely open towards the top along said discharge openings, at least to the level of the discharge opening situated in a higher position.

The invention is described below as a preferred illustrative embodiment of an arrangement for an inlet pipe, in conjunction with which reference is made to the drawings, in which:

FIG. 5 shows the arrangement in schematic form installed in a drum sieve;

FIG. 5A shows the arrangement from above;

FIG. 6 is a section along line VI—VI in FIG. 5A;

FIG. 7 is a section along line VII—VII in FIG. 5A;

FIG. 8 is a section along line VIII—VIII in FIG. 5A;

FIG. 9 is a section along line IX—IX in FIG. 5A.

Figure 1:
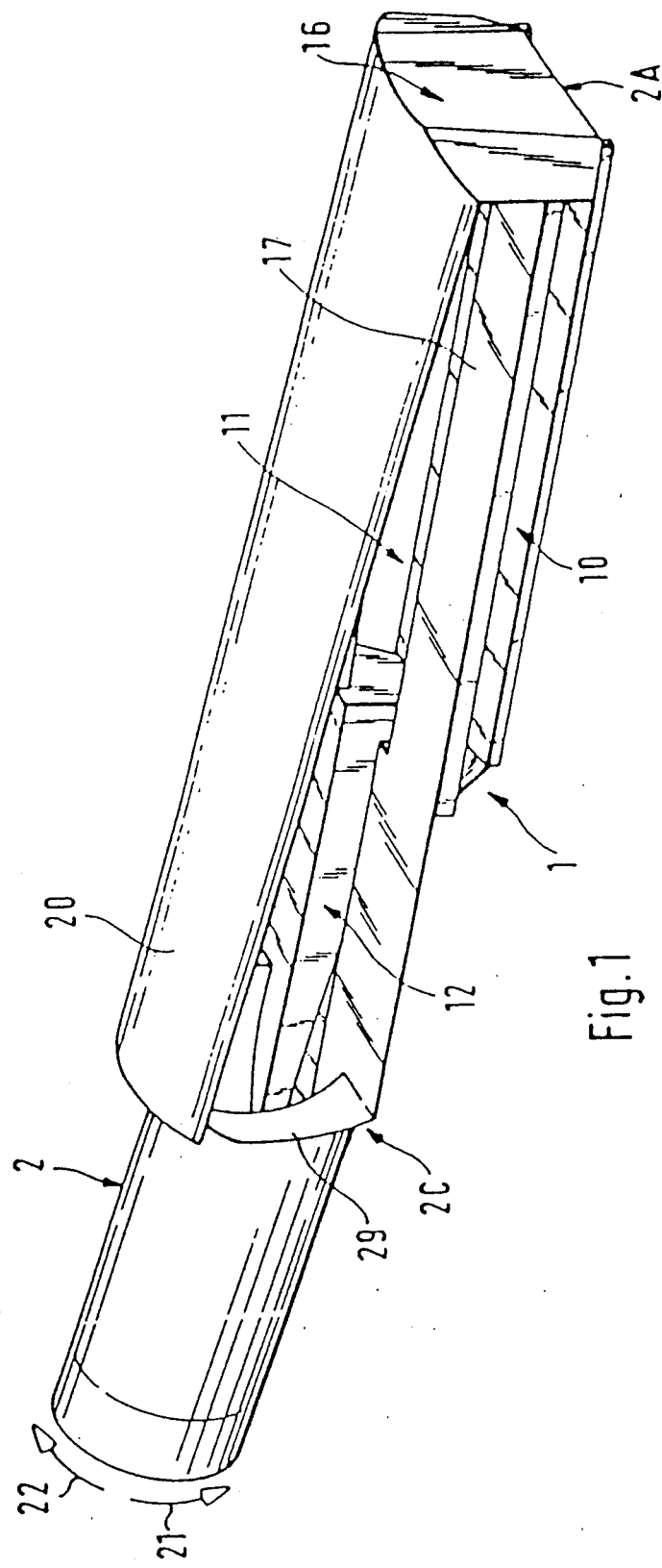
FIG. 1 shows in perspective an inlet arrangement arranged in accordance with the present invention, viewed at an angle from the front.
Figure 2:
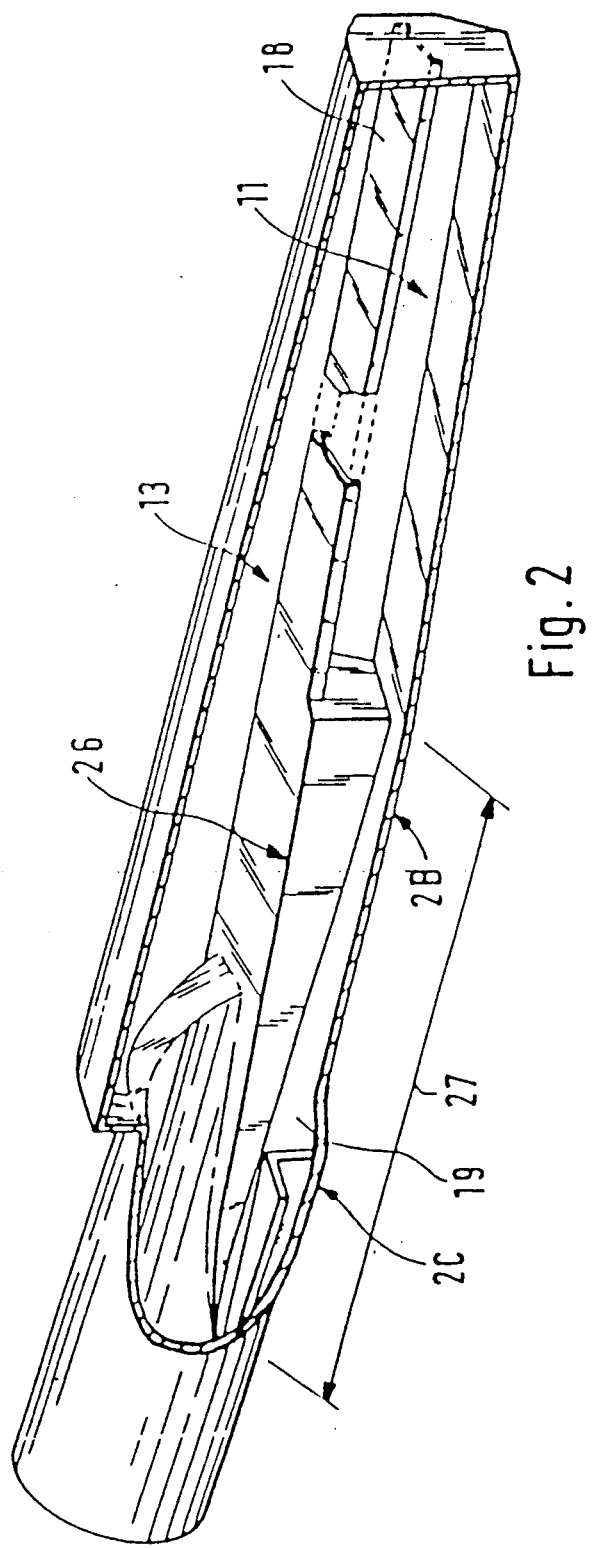
FIG. 2 shows a sectioned view of the arrangement.

An arrangement 1 for an inlet pipe 2 arranged in accordance with the present invention, which inlet pipe is suited to the supply of sludge 3 or a similar liquid mixed with particles to the inside 4 of a rotatably driven drum sieve 5, which along its casing 5A exhibits appropriate passageways 6 to permit the flow of sieved liquid 7 from the inside 4 of the drum, for the purpose of enabling effective separation of the liquid 7 from any screenings which are present to be achieved, which screenings can be discharged via an opening 8 at the end 5B of the drum, comprises a number of discharge openings 10, 11, 12, 13, extending along the longitudinal axis 9 of the drum and capable of being accommodated in the internal space 4 of the drum. These discharge openings 10-13 in the inlet pipe 2 are so arranged as to supply fluid sludge, etc., 3 in an effective manner via the inlet pipe 2 to the inside 4 of the drum along the internal surface 5A of its casing.

In accordance with the invention at least two simultaneously operating discharge openings 10, 12 and 11, 13 are situated on levels 14, 15 separate from one another for the purpose of supplying sludge, etc., 3 to the internal space 4 of the drum.

Figure 3:
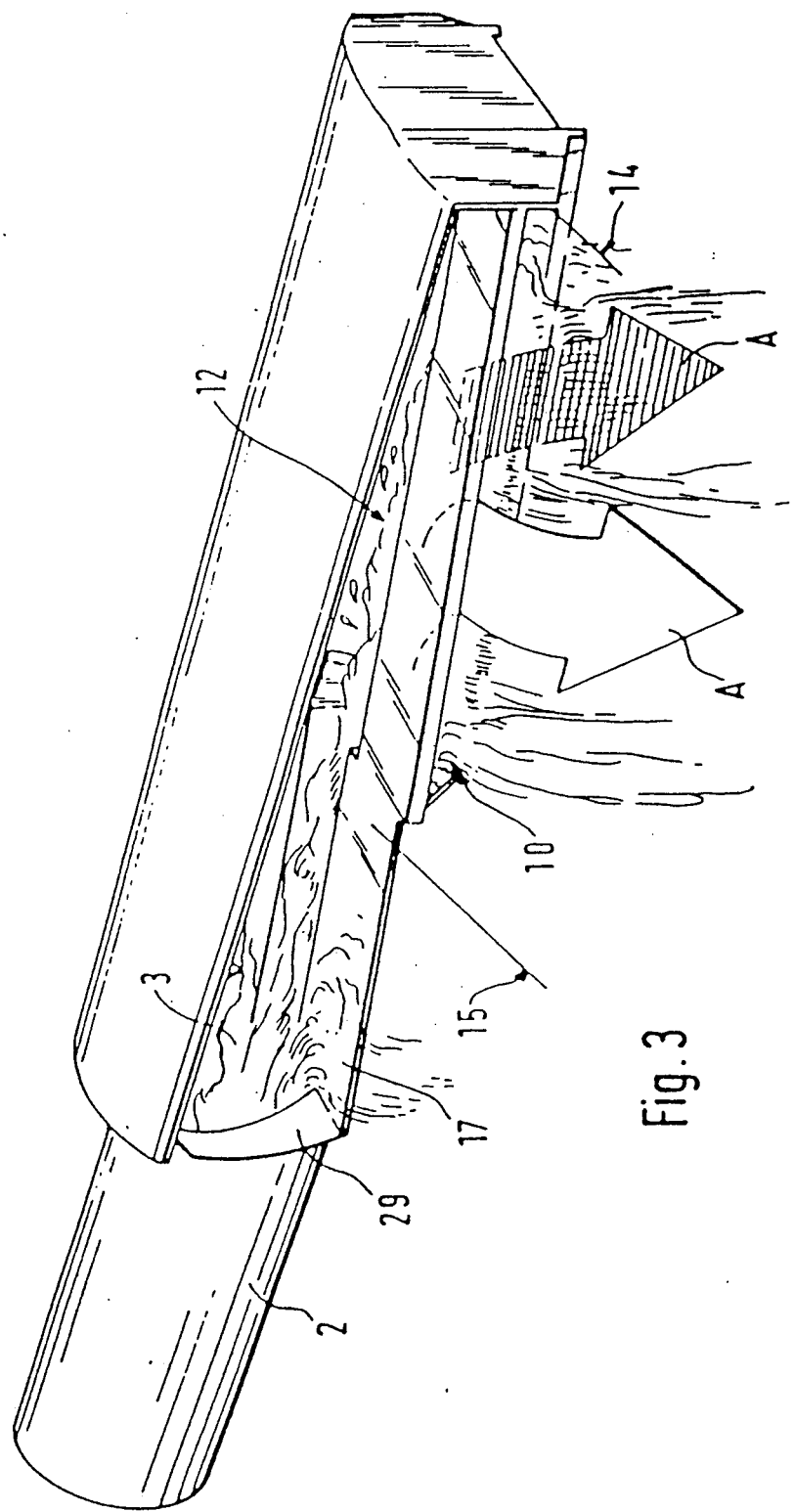
FIG. 3 shows the arrangement in its operative position with a small flow.

The discharge openings 10, 12 situated at a lower level 14 are so arranged as to be capable in the lateral sense of the pipe of accepting the whole of the flow below a rate of approximately 10 l/sec, of effectively feeding the sludge 3 along the extent of the openings in question, and of permitting the effective drainage of the pipe 2, as shown in FIG. 3.

Figure 4:
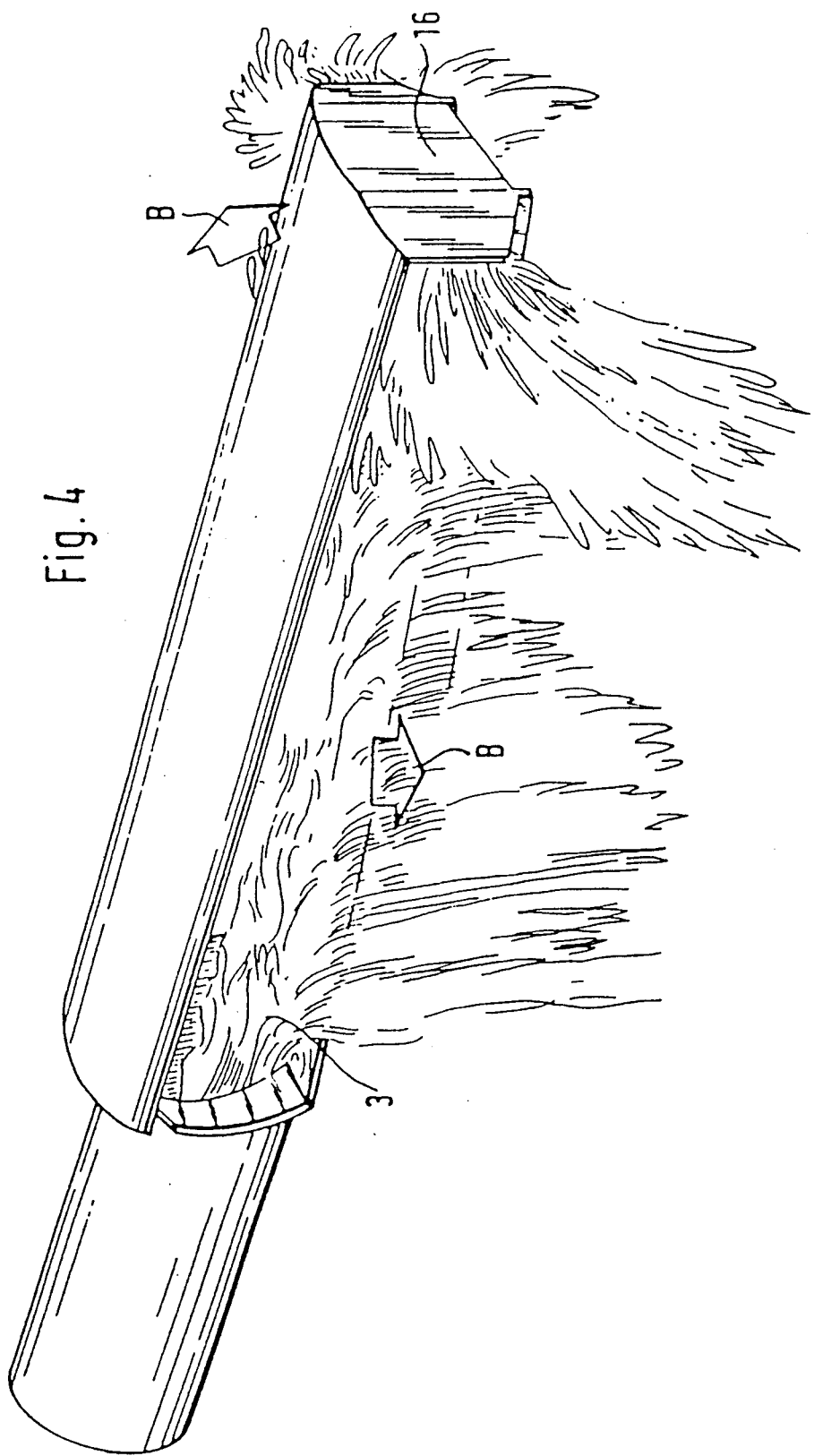
FIG. 4 shows the arrangement in its operative position with a large flow.

The discharge openings 11, 13 situated at a higher level 15 are so arranged as to be capable of accepting the whole of the flow exceeding a rate of approximately 10 l/sec, so that the sludge 3 can be fed effectively through the simultaneously operating discharge openings 10, 12 and 11, 13 along their respective extents, as shown in FIG. 4.

Arranged at the free end 2A of the inlet pipe is a flow restricter element 16, more specifically an end wall, attached to a flange 17, 18 which divides said discharge openings 10, 12 and 11, 13 one from the other. The end wall 16 exhibits essentially arched cross-sectional form away from the inside 4 of the inlet pipe, and is at the bottom attached to the bottom 19 of said inlet pipe, and is at the top attached to a roof 20 extending over the discharge openings 10-13, which roof exhibits essentially arched cross-sectional form away from the inside 4 of the inlet pipe.

The inlet part 2B of the inlet pipe which extends into the internal space 4 of the drum appropriately exhibits lower and upper discharge openings 10, 11 and 12, 13 arranged in pairs, which openings are situated directly in line with one another when the inlet pipe 2 is so arranged as to be set to its central pivoted position, in the event of the pipe 2 being pivotally arranged in the desired direction of rotation 21, 22.

The lower discharge openings 10, 11 in said channel-shaped inlet part 2B are appropriately slot-shaped and extend through the wall part 2C of said inlet part 2B, in conjunction with which the bottom 19 of said channel 2B is transformed into a lower lateral flow flange 24, 25 extending radially and along each lower opening 10, 11.

Upper openings 12, 13 are in turn restricted in a downward sense by said upper lateral flow flanges 17, 18, which extend radially and along each preferably slot-shaped upper opening 12, 13 and are attached to the element 16, which flanges appropriately extend radially further out in the lateral sense than the extent to which said lower lateral flow flanges 24, 25 extend radially in the lateral sense.

Said upper lateral flow flanges 17, 18 exhibit an essentially plane extent and extend preferably from the upper part 26 of the channel.

As will be appreciated from the drawings, the lower and upper discharge openings 10, 11 and 12, 13, which are preferably situated in pairs, exhibit different lengths viewed in the longitudinal sense of the inlet pipe, as a result of the two lower discharge openings 10, 11 starting a certain distance 27 inwards along the channel-shaped part 2B of the inlet pipe 2, thereby exhibiting a shorter longitudinal extent than the other discharge openings 12, 13.

The roof 20 is provided first and foremost for the purpose of protecting the inlet pipe 2 from falling screenings which may be scraped from the upper internal casing of the drum by means of a conveyor screw 28 operating in the internal space 4 of the drum along the surface 5A of its casing, and which would otherwise present the risk of dropping down and causing problems at the spillway and its associated sensor. On the other hand the roof 20 also produces a damming effect on the flow of the arriving sludge, etc., 3, should this exceed approximately 70 l/sec, for example. In the event of large flows of approximately 90-100 l/sec, the sludge, etc., 3, is discharged for the most part through the upper discharge openings 12, 13 in a direction of movement towards the screening discharge opening 8 situated at the end 5B of the drum. This may involve the entire drum 5 wishing to move in said direction. In order to counteract this force, which arises with large flows, the sludge, etc., 3 is forced upwards towards the roof 20, which is preferably executed as a sheet, and is caused by this to travel downwards towards the channel part 2B, and is thus also discharged via the lower openings 10, 11. A part of the arriving flow is imparted in this way with a counter-acting force, which, together with the angle of upward slope V of the drum, which may be of the order of approximately 6°, is sufficient for the drum 5 to rotate against its associated axial roll.

Arranged at the rear end 2C of the inlet pipe are reverse-flow protectors 29, which prevent the return flow of the sludge, etc., 3 outside the pipe 2.

The function of the invention should have emerged clearly from the above description, with reference to the drawings, although it may be stated briefly that, when the flow is small, the sludge, etc., 3 flows out in the direction of the arrows A through the lower openings 10, 11, whereas, when the flow is large, the sludge 3 also flows out in the direction of the arrows B through the upper openings 12, 13.

The invention is not restricted to the illustrative embodiment described above and illustrated in the drawings, but may be modified within the scope of the Patent Claims without departing from the idea of invention.

We claim:

1. Arrangement for an inlet pipe in a rotating drum sieve for supplying sludge or other liquid/solid mixtures to the inside of a drum sieve, comprising a drum sieve, a casing around said drum sieve, said casing having flow openings disposed along its length, an inlet pipe having at least one lower discharge opening and at least one upper discharge opening extending in the direction of the longitudinal axis of said drum sieve, said openings being accommodated in an internal volume of said drum sieve, said inlet pipe having an open area extending along each of said upper and lower discharge openings, said open top area upwardly extending at least to a location vertically even with said at least one upper discharge opening, a flow restrictor element disposed at a distal end of said inlet pipe, and a flange dividing said at least one upper discharge opening from said at least one lower discharge opening, said flow restrictor element being attached to said flange.

2. Arrangement according to claim 1, further comprising a roof attached to said flow restrictor element, said roof extending above said at least one upper discharge opening.

3. Arrangement according to claim 2, wherein said roof is arched.

4. Arrangement according to claim 3, further comprising a channel shaped inlet element, and an anterior end wall part disposed at a proximal end of said inlet pipe, said channel shaped inlet element extending through said anterior end wall part.

5. Arrangement according to claim 3, wherein said upper and said lower discharge openings are arranged in pairs disposed vertically in line with each other.

6. Arrangement according to claim 2, further comprising a channel shaped inlet element, and an anterior end wall part disposed at a proximal end of said inlet pipe, said channel shaped inlet element extending through said anterior end wall part.

7. Arrangement according to claim 2, wherein said upper and said lower discharge openings are arranged in pairs disposed vertically in line with each other.

8. Arrangement according to claim 1, further comprising a channel shaped inlet element, and an anterior end wall part disposed at a proximal end of said inlet pipe, said channel shaped inlet element extending through said anterior end wall part.

9. Arrangement according to claim 1, wherein said upper and said lower discharge openings are arranged in pairs disposed vertically in line with each other.

10. Arrangement for an inlet pipe in a rotating drum sieve for supplying sludge or other liquid/solid mixtures to the inside of a drum sieve, comprising a drum sieve, a casing around said drum sieve, said casing having flow openings disposed along its length, an inlet pipe having at least one lower discharge opening and at least one upper discharge opening extending in the direction of the longitudinal axis of said drum sieve, said openings being accommodated in an internal volume of said drum sieve, said inlet pipe having an open area extending along each of said upper and lower discharge openings, said open top area upwardly extending at least to a location vertically even with said at least one upper discharge opening, a channel shaped inlet element, an anterior end wall part disposed at a proximal end of said inlet pipe, said channel shaped inlet element extending through said anterior end wall part, and a radially extending lower lateral flow flange disposed near a bottom section of said channel shaped inlet element.

11. Arrangement according to claim 10, further comprising an upper lateral flow flange extending laterally beyond said lower lateral flow flange.

12. Arrangement according to claim 11, wherein said upper lateral flow flange extends in a planar direction from an upper section of said channel shaped inlet element.

13. Arrangement according to claim 10, further comprising a radially extending upper lateral flow flange, wherein said upper lateral flow flange restricts flow through said at least one upper discharge opening.

14. Arrangement according to claim 10, wherein said upper and said lower discharge openings are arranged in pairs disposed vertically in line with each other.

15. Arrangement for an inlet pipe in a rotating drum sieve for supplying sludge or other liquid/solid mixtures to the inside of a drum sieve, comprising a drum sieve, a casing around said drum sieve, said casing having flow openings disposed along its length, an inlet pipe having at least one lower discharge opening and at least one upper discharge opening extending in the direction of the longitudinal axis of said drum sieve, said openings being accommodated in an internal volume of said drum sieve, said inlet pipe having an open area extending along each of said upper and lower discharge openings, said open top area upwardly extending at least to a location vertically even with said at least one upper discharge opening, wherein said upper and said lower discharge openings are arranged in pairs disposed vertically in line with each other.

16. Arrangement for an inlet pipe in a rotating drum sieve for supplying sludge or other liquid/solid mixtures to the inside of a drum sieve, comprising a drum sieve, a casing around said drum sieve, said casing having flow openings disposed along its length, an inlet pipe having at least one lower discharge opening and at least one upper discharge opening extending in the direction of the longitudinal axis of said drum sieve, said openings being accommodated in an internal volume of said drum 8 sieve, said inlet pipe having an open area extending along each of said upper and lower discharge openings, said open top area upwardly extending at least to a location vertically even with said at least one upper discharge opening, a channel shaped inlet element, an anterior end wall part disposed at a proximal end of said inlet pipe, said channel shaped inlet element extending through said anterior end wall part, wherein said upper and said lower discharge openings are arranged in pairs disposed vertically in line with each other.

17. Arrangement for an inlet pipe in a rotating drum sieve for supplying sludge or other liquid/solid mixtures to the inside of a drum sieve, comprising a drum sieve, a casing around said drum sieve, said casing having flow openings disposed along its length, an inlet pipe having at least one lower discharge opening and at least one upper discharge opening extending in the direction of the longitudinal axis of said drum sieve, said openings being accommodated in an internal volume of said drum sieve, said inlet pipe having an open area extending along each of said upper and lower discharge openings, said open top area upwardly extending at least to a location vertically even with said at least one upper discharge opening, a channel shaped inlet element, an anterior end wall part disposed at a proximal end of said inlet pipe, said channel shaped inlet element extending through said anterior end wall part, and a radially extending upper lateral flow flange, said upper lateral flange arranged and constructed to restrict flow through said upper discharge opening, wherein said upper and said lower discharge openings are arranged in pairs disposed vertically in line with each other.

* * * * *